Dec. 4, 1928.
E. A. BARBET
1,693,774
APPARATUS FOR THE CONTINUOUS PRELIMINARY TREATMENT OF CRUDE BENZOLS
Filed Dec. 1, 1925
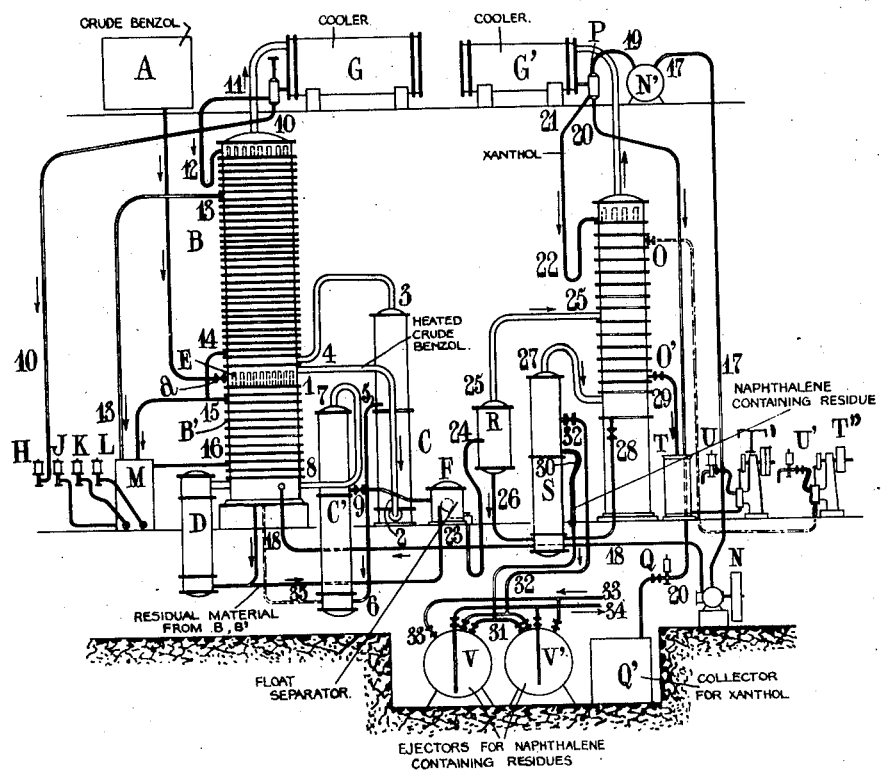
E. A. Barbet
INVENTOR
By: Marks & Clerk
Attys.

Patented Dec. 4, 1928.

1,693,774

UNITED STATES PATENT OFFICE.

EMILE AUGUSTIN BARBET, OF PARIS, FRANCE.

APPARATUS FOR THE CONTINUOUS PRELIMINARY TREATMENT OF CRUDE BENZOLS.

Application filed December 1, 1925, Serial No. 72,573, and in France December 5, 1924.

This invention relates to the preliminary treatment of crude benzols.

When benzols contained in town gas or in coke oven gas are extracted by washing with heavy oil, the bodies absorbed by the oil are recovered by distillation, the crude benzol thus obtained being a very complex and impure product from which it is necessary to separate the numerous components in a chemically pure state.

This work comprises three stages:

A first fractioning, dividing as strictly as possible the various components into a certain number of groups which are clear and free from tars.

A careful chemical treatment of each of these various groups by, for instance, agitation with sulphuric acid, soda, or other reagents.

Finally, the definite rectification of the liquids thus chemically purified.

The last two treatments will only give products possessing the degree of purity required to-day in commerce if the first rough stage has been carried as far as possible.

Further, apart from pure benzene and toluene, there exists to-day important outlets for xylene, xanthene, solvent-naphtha and naphthalene. It is therefore necessary to separate and refine even these heavy products as well as the lighter products.

The object of the present invention is to provide apparatus adapted to enable crude benzols to be treated economically and continuously with the production of the various grades of aromatic hydrocarbon material recognized as commercial products.

The characteristic features of the invention will be specified in the appended claims and will be indicated in the following detailed description of one construction of apparatus in accordance with the invention, reference being made to the drawing in which a diagrammatic representation of this construction is illustrated.

Referring to the drawing:

A is the upper reservoir into which is pumped the crude benzol. This liquid, passing through the supply cock $a$, first enters the tubular heater E and at the same time producing a certain amount of condensation of the heavy vapours arising from the plates of the column B'.

From here the benzol passes through the pipe 1, 2 in order to reach the base of the tubular heater C adapted to vaporize the lightest products, that is to say those which boil at temperatures up to approximately 110 to 115° centigrade, which vapours return by way of the pipes 3—4 to the base of the column B.

The non-vaporized portion of the crude benzol descends through the pipe 5—6 to the base of the tubular member C' which is heated to a higher temperature sufficient to cause the whole of the xylene contained in the crude benzol to be evaporated, the vapours thereby produced and issuing through pipe 7—8 enter the column B' adjacent to the base thereof.

The non-vaporized crude residue, well exhausted of xylene issues through the cock 9 and passes into a float separator F the purpose of which will be indicated hereinafter.

As will be seen the crude liquid has been carefully kept away from the column B B'; in order that this column will remain absolutely clean care is taken to provide the two heaters C and C' with large upper chambers adapted to retain the froth and spray or liquid particles projected from the body of liquid treated therein as the result of the ebullition of certain of its constituents.

The column B B' works in the same way as all continuous rectifiers: the column is surmounted with a powerful water condenser G, vertical or horizontal, provided with a coil or group of tubes, which effects at the same time the condensation of all the vapours and the cooling of the resulting liquid.

A small proportion of the latter issues through the tube 10—10 and reaches the test device H. This liquid contains all the lightest substances and in particular carbon bisulphide with a certain proportion of benzene.

All the rest refluxes in the top of the column through the siphon tube 11—12 and forms the reflux liquid through which bubble the vapors which rise in order to become classified and refined, the reflux descending from plate to plate. Through the tube 13—13 a partial extraction of the reflux which is cooled in the triple cooler M and issues through the test device J takes place, this material being rough treated benzene or "benzol at 90%" passing over below 100°.

Much lower, at 14 or 15, that is to say above or below the tubular member E the extraction of a further portion of the reflux takes place: this is toluol, mixed with a small proportion of benzene and xylene. It is cooled in the second coil of M and passes out through the test device K.

Finally at 16 the extraction of the xylol takes place which is cooled in the third coil of M and passes out through the fourth test device L.

The vapours provided by the two tubular heaters C and C' would certainly not be sufficient to supply the heat necessary to enable a suitable fractionation of each of the four groups extracted to be secured. In order to supply additional heat a third tubular heater D has been added in which circulate the heavy refluxes from the base of the column. This enables all of the xylol remaining in these refluxes to be vaporized. The final excess of this liquid reflux passes to the float separator F.

In order to cause the heavier products, xanthene and solvent naphtha to boil steam at a pressure of 9–10 kilograms per square centimeter would be insufficient unless also the employment of vacuum is resorted to.

The vacuum is produced by the aid of a dry air pump N; connected to the vessel N' by means of the pipe 17—17, and the delivery of the pump is connected through the pipe 18—18 into the base of the first column B B'.

The vapours leaving the column O O' are delivered into a powerful condenser G' and preferably having a horizontal group of tubes and according to French specification 592,400, dated March 31, 1924, for "Tubular condensers with a large output adapted for use in all distilling or rectifying apparatus" filed in the name of the Société des Etablissements Barbet.

The outlet separator P for the condensed and cooled distillate communicates with the vacuum vessel N' through the pipe 19. Through the pipe 20—20 is extracted a small amount of the distillate which carries along what may remain of xylol, mixed with nearly the whole of the xanthol. This material passes to the test device Q, located on the ground level from which it passes to the vat Q'. The height above the ground of the separator P is sufficient for the liquid, in spite of the vacuum, to descend barometrically into the test device Q without the necessity for employing a pump.

The remainder of the distillate, descending through the siphon tube 21—22 forms the reflux liquid of the plates of the column O O'.

The column O O' receives heavy hydrocarbon vapours from two sources.

The residual liquids of the first column, collected in the float separator F pass out through the siphon tube 23 and are drawn through 24 into the expansion vessel R which is under a vacuum.

The liquid in F is very hot, (approximately 160° C.), its boiling temperature is suddenly lowered by 80 to 90 degrees on account of the vacuum existing in R, so that a violent ebullition is produced in R. The resulting vapour formed therein is led through 25—25 to a point half way up the column O O'.

The portion which has resisted evaporation passes out of R through 26 and is supplied to the base of the tubular heater S which is strongly heated by steam from a boiler working at a pressure of 9 to 10 kgs. per square centimetre.

S is provided (like C and C') with a safety chamber of sufficient height to prevent dirty tarry liquid being carried into the column O O' so that the latter, may be, as is the case with B B', free from tar and the like.

The vapours issuing through the pipe 27 are delivered into the base of the column O O'.

In order to complete the amount of vapour necessary for a good refining in the column O O' the spent refluxes from the base enter through the pipe 28 into the base of the tubular heater S.

Solvent naphtha is led out by way of the pipe 29 and is cooled in the cooler T, being drawn off by the pump T' and delivered into the test device U.

The residue containing naphthalene and boiling in S passes out through the pipe 30—31 and enters into either of the cylinders V or V' as desired. These cylinders are nothing more than compressed air lifts or ejectors. Vacuum is created in them by means of the pipe 32 while they are being filled. To discharge them their connection with the vacuum pump is broken, and compressed air is led in through the pipe 33 and the liquid, which is still very hot, is expelled and delivered through the pipe 34 to the naphthalene crystallizers which are not shown in the drawing.

It is permissible to cut out at the base of the first column B B' the additional heater D by operating in the same manner as for the second column O O', that is to say by sending the refluxes from the base of the column to the base of the heater C' where they become mixed with the crude liquid by way of the pipe shown in dotted lines at 35.

The same may even be done for the first heater C by delivering to it a greater or less proportion of the reflux of the last rectifying plate B, just above the inner tubular member E.

An additional fractionation may be carried out by directing the vapours arising in R into a special cooling condenser with a separate test device instead of into the column O O' and the degree of vacuum in R may be regulated so as to ensure that only the most volatile constituents of the liquid supplied thereto are vaporized.

Alternatively the flow into the test device Q may be reduced to a very small proportion, which flow will be joined to the product of the test device L of the first column. On the other hand at the top of the column O a partial extraction of reflux may be effected, just as only a partial extraction of the reflux is effected by way of 13 from the first column. This liquid will be a xanthene quite free from xylene. It will be necessary to cool it by means of a second coil placed in T, to extract it by means of a pump T'' and send it into a test device U'.

On the other hand if the works has at its disposal steam at more than 180° C. it may, dispense with installing the vacuum column, and in this case the first column enables it to extract solvent naphtha through the pipe 35, still on account of the fact that this column only contains clean liquids.

In this case the heavy residues passing out of the heater C C' will go directly to the naphthalene crystallizer.

Finally, if in the works steam at an insufficient pressure, for example 5 kilograms only is available, the apparatus described will still be able to work but will not enable the fractionation of the solvent naphtha nor even of xanthene to be accomplished. The first column instead of giving four fractions will only give three namely: sulphur containing head products, benzene and toluene.

The second column will give: at the head xylene and at the tail a mixture of xanthene and solvent naphtha. Finally the crystallization of the naphthalene may be difficult as there will exist a slightly excessive portion of solvent naphtha in the residues of the vessels V V'.

What I claim is:—

1. Apparatus for the continuous preliminary treatment of crude benzols in order to prepare them for final rectifying, comprising a first rectifying column, a vaporizer connected to said first rectifying column, means for supplying the benzols to be treated to the vaporizer, means for introducing the vapours produced in the vaporizer into the first rectifying column, means for withdrawing the lower boiling constituents of the benzols from the said first rectifying column under atmospheric pressure, means for withdrawing the higher boiling fractions from the first column in the liquid state, a second rectifying column, a vacuum pump connected to said second column to maintain a reduced pressure therein, a chamber connected to said second column, means to supply vapours from said chamber to said second column and means to deliver the higher boiling liquid residue from the first column to said chamber, a heater connected to the second column, means for delivering liquid from the base of said chamber to the heater, means to deliver vapours produced in the heater to the second column and means connected to the second column to collect and condense the vapours arising therein.

2. Apparatus for the continuous preliminary treatment of crude benzols in order to prepare them for final rectifying, comprising a first rectifying column, a vaporizer connected to said first rectifying column, means for supplying the benzols to be treated to the vaporizer, means for introducing the vapours produced in the vaporizer into the first rectifying column, means for withdrawing the lower boiling constituents of the benzols from the said first rectifying column under atmospheric pressure, means for withdrawing the higher boiling fractions from the first column in the liquid state, a second rectifying column, a vacuum pump connected to said second column to maintain therein a reduced pressure, a chamber connected to said second column, means to supply vapours from said chamber to said second column, means to deliver the higher boiling liquid residue from the first column to said chamber, a heater connected to the second column, means for delivering liquid from the base of said chamber to the heater, means to deliver vapours produced in the heater to the second column, means connected to the second column to collect and condense the vapours arising therein, means for extracting the liquid residue from the second column and for supplying the said residue to the heater connected thereto in order to permit a heat interchange between said residue and the liquid introduced into the said heater from the chamber and means for withdrawing the liquid residue from said heater.

In testimony whereof I have signed my name to this specification.

EMILE AUGUSTIN BARBET.